No. 687,710. Patented Dec. 3, 1901.
O. ADAMS.
BOTTLE STOPPER.
(Application filed Dec. 10, 1900.)
(No Model.)
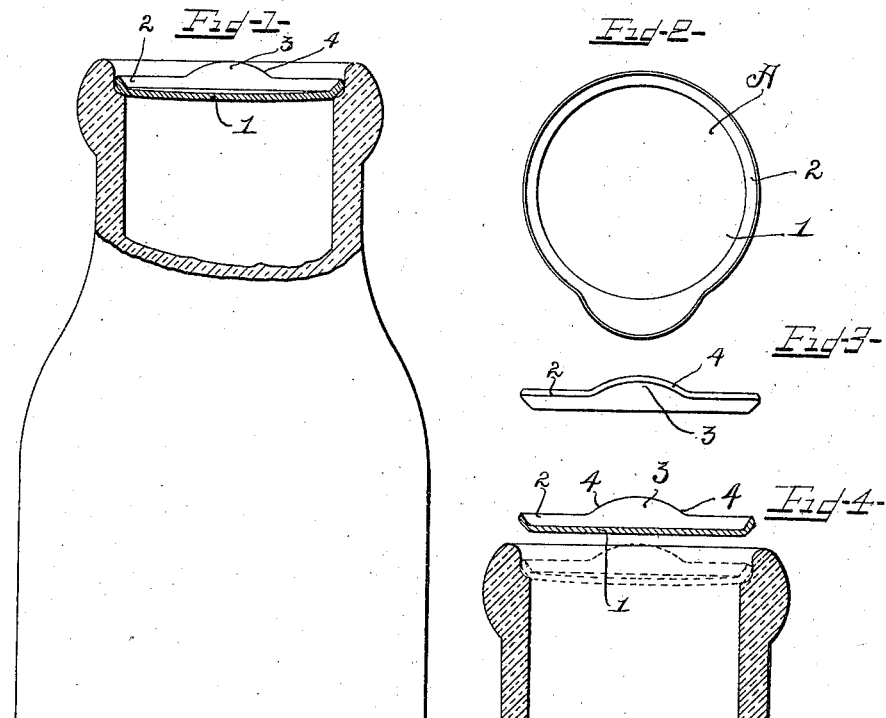
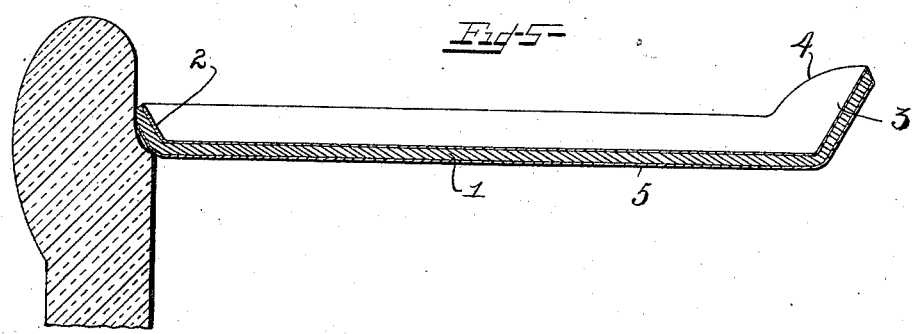
Witnesses
Milton M. Alexander
Max W. Zabel
Inventor
Otis Adams
By Charles A. Brown & Cragg
Attorneys
THE NORRIS PETERS CO., PHOTO-LITHO., WASHINGTON, D. C.

UNITED STATES PATENT OFFICE.

OLIN ADAMS, OF CHICAGO, ILLINOIS.

BOTTLE-STOPPER.

SPECIFICATION forming part of Letters Patent No. 687,710, dated December 3, 1901.

Application filed December 10, 1900. Serial No. 39,340. (No model.)

*To all whom it may concern:*

Be it known that I, OLIN ADAMS, a citizen of the United States, residing at Chicago, in the county of Cook and State of Illinois, have invented a certain new and useful Improvement in Bottle-Stoppers, (Case No. 1,) of which the following is a full, clear, concise, and exact description, reference being had to the accompanying drawings, forming a part of this specification.

My invention relates to stoppers or closures for sealing bottles, especially milk-bottles.

Prominent objects of the invention are to provide a form of stopper which can be made at a minimum expense, to make same thoroughly effective in forming a perfectly tight joint or closure of the bottle, to insure the holding of the stopper in the bottle or, in other words, to prevent its accidental removal or displacement therefrom, and to provide for the easy and quick extraction of the stopper from the bottle whenever desired.

To the attainment of these and other desirable ends my invention consists in the matters hereinafter set forth.

In the accompanying drawings, Figure 1 is a bottle having a stopper embodying my invention. Fig. 2 is a plan of such a stopper. Fig. 3 is a front elevation of the same. Fig. 4 is a view of the neck of the bottle and the stopper about to be inserted into the same, both shown in vertical section. Fig. 5 is a cross-section of one of the stoppers on an enlarged scale.

The stopper A illustrated desirably comprises a flat body portion 1, having an annular rim 2, which surrounds the body portion 1 and extends upwardly and outwardly from the same. The rim 2 is made solid or continuous throughout its circumference—that is to say, it is not slotted or slitted at intervals. It is slightly larger than the interior of the bottle-neck, as shown by reference to Fig. 4. This rim 2 is desirably made integral with the body portion 1 of the stopper. The rim 2 is desirably provided with a tab 3, which extends or projects outwardly from the rim and whose sides 4 4 flare or diverge so as to be widest next to the rim.

The stopper is desirably composed of pasteboard material, provided on its under side with a skin or layer of parchment or like material 5 which is impervious to liquid. Both sides of the stopper are desirably coated or steeped in paraffin or like substance to render it absolutely liquid-proof.

The stopper A prior to insertion in the bottle is illustrated in Fig. 4 and after insertion is shown in Fig. 1. By making the rim 2 slightly larger than the interior of the bottle-neck this rim is bent slightly upward when the stopper is inserted in the bottle-neck. This will be noticed in Fig. 4, in which the stopper inserted in the bottle is shown in dotted lines. In this way the rim 2, when the stopper is inserted, will have a tendency to spring or expand outwardly, and so will cause a tight joint to be made around its entire circumference between its outer edge and the interior of the bottle-neck. This will insure an absolutely tight closure of the bottle against the leakage of the contents thereof. At the same time the edge of the rim will engage the interior of the bottle-neck and so will tend to hold the stopper against movement out of the bottle-neck. Any force from the interior of the bottle tending to remove the stopper will only act to force the edge of the rim 2 more tightly against the interior of the bottle-neck, and thereby clamp the stopper more closely in position in the neck. It will be further seen that in the stopper shown the bending of the rim slightly upward will cause the annular edge of the rim 2 to face upwardly to such an extent as to remove it from access by the contents of the bottle. In this way the stopper is kept absolutely dry and tight, the liquid in the bottle being unable to gain access to it through the annular edge of the stopper.

The presence of a layer or skin 5 of parchment or like impervious material makes the stopper thoroughly water and acid proof. It acts to reinforce the material of the stopper, so that when the rim thereof is first bent to form the stopper and is then subsequently slightly bent to a greater extent by the introduction of the stopper in the bottle the lower or convex side of the annular bending-line will not be broken or torn by the bending operations. It is obvious that pasteboard material when bent nearly at right angles to itself, as shown by the rim 2 in Fig. 1, would naturally break or crack along the bending-line. This is prevented by the layer of parchment 5.

The stopper can easily be removed from the bottle by taking hold of the tab 3 and lifting up the tab, so that the side of the stopper is first withdrawn and then the remaining portion of the stopper follows. The inwardly-flaring sides of the tab 3 prevent the tab from being torn from the rim, and this result is added to by the presence of the layer or skin 5 of the parchment on the bottom of the stopper.

It will be seen that the rim 2 of my improved stopper extends but slightly above the body portion 1, so that when the stopper is introduced into the bottle-neck the annular edge of the rim 2 directly engages the interior of the bottle-neck. This is a difference in structure and result from a form of stopper which it has been heretofore proposed to construct, in which form the stopper is provided with a high rim which is extended up beyond the top of the bottle, so that the annular edge of the rim entirely fails to engage the interior of the bottle-neck. In this case the sides of the rim engage the bottle-neck, the whole stopper, including the rim, being made of metal, which is adapted to spring outwardly, so as to cause an engagement of the sides of the rim throughout a considerable portion of the height thereof.

In the manufacture of stoppers embodying my invention I find a desirable way is to run long pieces of properly-prepared material, having a layer or skin of parchment on one side, through machines, by which they are coated with liquid paraffin or the like. These strips of material are then cut, if need be, into narrower strips of slightly-greater width than the diameter of the stoppers. The stoppers are then punched from these narrow strips into the shape shown in the drawings. In this way the stoppers can be made in large numbers in a very short time and at an exceedingly low expense, both for material and labor.

What I claim as my invention is—

1. A bottle-stopper having an outwardly-inclined upturned elastic rim which extends but slightly above the stopper, whereby the stopper can be inserted in an ordinary bottle-neck slightly smaller than the diameter of the rim, and when so inserted the rim will be bent slightly upward and its annular edge will engage the straight interior of the neck, substantially as described.

2. A bottle-stopper composed of a layer of fabric having its annular edge portion bent so as to form an outwardly-inclined, upturned rim extended but slightly above the body portion of the stopper, whereby when the stopper is inserted in the neck of the bottle the rim will be bent slightly upward and its annular edge will engage the interior of the straight portion of the bottle-neck, substantially as set forth.

3. A bottle-stopper consisting of a body portion and a rim extending outwardly and upwardly to an extent to cause its annular edge to engage the interior of the straight portion of the bottle-neck when the stopper is introduced thereinto, the said stopper being composed of pasteboard material provided on its lower side with an impervious skin.

4. A bottle-stopper having a body portion and a rim formed integrally therewith, the said body portion and rim being composed of pasteboard material having a layer of parchment on its lower side, whereby when the stopper is inserted in the bottle-neck the rim will be bent slightly upward and its annular edge will engage the interior of the straight portion of the bottle-neck and the layer of parchment will prevent access of the contents of the bottle to the pasteboard material.

5. A bottle-stopper consisting of a body portion and a rim extending outwardly and upwardly to an extent to cause its annular edge to engage the interior of the straight portion of the bottle-neck when the stopper is introduced thereinto, the said stopper being composed of material provided on its lower side with an impervious skin.

6. A bottle-stopper consisting of a substantially flat body portion and a rim extending outwardly and upwardly to an extent to cause its annular edge to engage the interior of the bottle-neck when the stopper is introduced therein, the body portion and rim being composed of fabric having its under side provided with a skin or layer of impervious material and the rim being provided with a tab whose sides diverge at their point of juncture with the rim, substantially as described.

In witness whereof I hereunto subscribe my name this 6th day of December, A. D. 1900.

OLIN ADAMS.

Witnesses:
A. MILLER BELFIELD,
HARVEY L. HANSON.